United States Patent [19]

Schmutz

[11] Patent Number: 4,700,632

[45] Date of Patent: Oct. 20, 1987

[54] DEVICE TO RETAIN ROLLER COASTER PASSENGERS IN STANDING POSITION

[75] Inventor: Bernard P. Schmutz, Vaud, Switzerland

[73] Assignees: Giovanola Freres SA, Monthey; Intamin AG, Freienbach, both of Switzerland

[21] Appl. No.: 907,978

[22] Filed: Sep. 16, 1986

[30] Foreign Application Priority Data

Sep. 17, 1985 [CH] Switzerland ............... 4014/85

[51] Int. Cl.$^4$ ............................................. A63G 21/04
[52] U.S. Cl. ....................................... 104/63; 104/53; 272/44; 297/486; 297/487
[58] Field of Search ............... 105/329.1; 104/25, 53, 104/63, 82, 241; 272/36, 44, 33, 43, 112, 120, 134, 143, 144; 297/DIG. 10; 244/4 A, 122 AG; 198/321; 280/751; 128/1 A, 133, 134; 297/486, 487

[56] References Cited

U.S. PATENT DOCUMENTS 4,054,319 10/1977 Fogg, Jr. et al. ...... 297/DIG. 10 X
4,531,459 7/1985 Yamada .................... 104/63 X
4,623,194 11/1986 Pillot .................... 297/DIG. 10 X

*Primary Examiner*—Randolph A. Reese
*Assistant Examiner*—John G. Pido
*Attorney, Agent, or Firm*—Sherman and Shalloway

[57] ABSTRACT

To enable a passenger to ride a "roller coaster" in a standing position, the inventive device includes a seat placed between the legs of the passenger, a back member with a headrest incorporated in it, and two harnesses which provide retention of the passenger from above as well as lateral retention of his head and good front and lateral retention of his body. One of the harnesses is movable and can be swung upwardly to enable easy access to the subject device by the passenger and to enable a ventral bar to be brought into tight contact with the passenger's abdomen before being locked shut in that position. Because the sliding carriage which bears the two harnesses, the back member and the seat are displaceable and lockable along the columns which have their base fixed to the chassis of the train, the present invention can accommodate passengers of different heights and sizes and reliably retain such passengers regardless of their orientation in space during the operation of the associated roller coaster.

4 Claims, 1 Drawing Figure

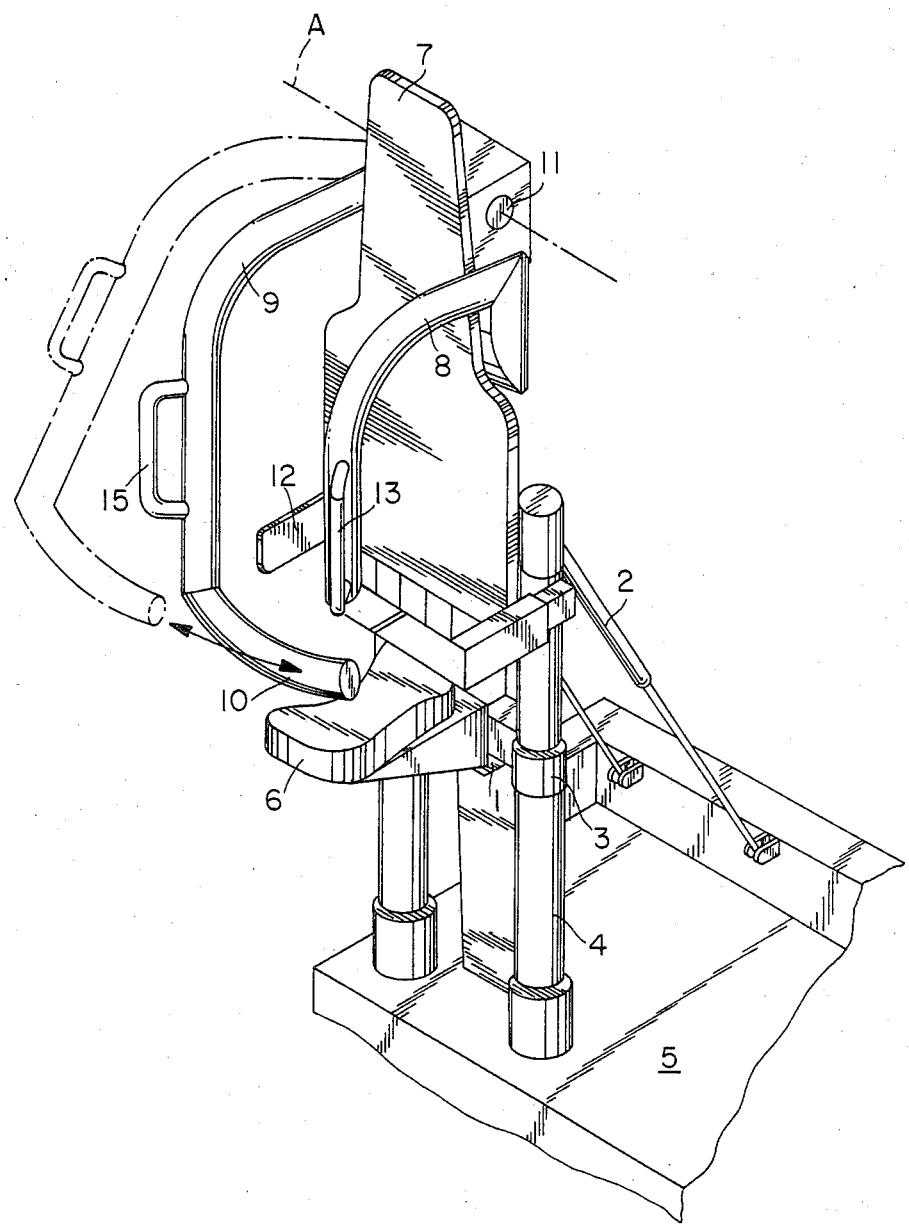

DEVICE TO RETAIN ROLLER COASTER PASSENGERS IN STANDING POSITION

BACKGROUND OF THE INVENTION

The invention relates to a device for retaining passengers in a standing position on a "roller coaster."

In amusement parks, fairs and the like, roller coasters, which execute loops, plunges, spirals, ascending spirals (with slowdown), etc., are well known and appreciated by the public, because they enable people to enjoy a sensation of danger, while providing perfect safety. Based on the position and velocity of the train and the configuration of the curves which it passes through, the passengers on a roller coaster can be found in virtually any orientation at any given point of the course, and can be subjected to acceleration in any direction.

A device is known from German Publication No. 32 37 684 A1, which enables a passenger to ride through the complete passage of a roller coaster ride in a standing position. However, this device has a number of disadvantages, in particular relating to its manipulation, and to the comfort of the passenger being held thereby.

SUMMARY OF THE INVENTION

An object of the present invention is a device of the type described initially above which satisfies all safety and comfort requirements, regardless of the height, corpulence, age, or anatomy of the passengers, whereby the passengers can ride through the entire course completely safely in a standing position, while at the same time having great freedom of movement and a sensation of danger.

In a further object, the device must permit easy and rapid entry, exit and seat adjustment (according to the height and other dimensions of the passenger), while providing ready access to the passenger location; and may not require more than two adjustment operations, which must be simple and may not permissibly rely on any external energy source.

These and other objects, aspects and features of the present invention will be better understood from the following detailed description of the preferred embodiment, when read in conjunction with the appended drawing figure.

BRIEF DESCRIPTION OF THE DRAWING

FIG. 1 is a perspective view of the preferred embodiment of the present invention.

SPECIFIC DESCRIPTION OF THE PREFERRRED EMBODIMENT

A sliding carriage 1, preferably equilibrated by a spring means such as a gas shock absorber 2, slides vertically along two columns 4 by means of four bearings 3. The columns are fixed to the chassis 5 of the roller coaster vehicle, at the base of said columns. The sliding carriage can be locked, preferably mechanically, at any altitude along the columns 4, to suit the height of the passenger being retained while the roller coaster is passing over the course. A saddle-shaped seat 6, preferably padded, is affixed to the sliding carriage 1. The shape of seat 6 provides secure lateral and longitudinal means of holding the passenger. The sliding carriage 1 also bears a back member 7, preferably curved and equipped with an integral headrest. On one lateral side of the back member 7, a fixed harness 8, preferably padded and furnished with a hand grip 13, is mounted on the sliding carriage 1. On the other lateral side of the back member 7, a movable harness 9, preferably also padded and furnished with a hand grip 15, is strongly attached to the sliding carriage 1. The lower part of this movable harness 9 has a continuation in the form of a ventral bar 10 which extends horizontally in front of the back member 7. On the side corresponding to the movable harness 9 (the side opposite to the fixed harness 8), a lateral retaining member 12, also preferably padded, is affixed to the sliding carriage 1. In the upper part, behind the headrest which is mounted on the back member 7, a rotation arm 11 rotatable about the axis A and having a locking device is fixed to the sliding carriage 1. The said locking device is preferably mechanical, and enables the movable harness 9 to be locked in any rotational position.

The device for retaining passengers thus constructed functions as follows:

The seat 6 is adjusted to the highest possible position between the legs of a passenger who is to be retained during the next run of the train. The passenger arranges his back against the back member 7 and engages one shoulder and one arm in the fixed harness 8 ahead of the subject device for retaining passengers. The sliding carriage 1 is locked at this adjusted altitude on the columns 4, by locking means of any known type (not shown). The movable harness 9, which initially is in the upward-swung position shown in phantom in order to provide free entry into the device for retaining passengers, is then lowered by the passenger, who rotates it around the rotation axis A of the arm 11 until the ventral bar 10 is in tight contact with his abdomen. In this closed position, the rotation arm 11, and therefore the movable harness, is locked by its locking device, not shown.

The passenger is now firmly held on the inventive device for retaining passengers, with the back side of the passenger being retained by the back member 7; and the two sides of the head, the shoulders, chest and abdomen being retained by the two harnesses 8 and 9; and the legs and lower torso by the seat 6 extending between the legs. The lateral retaining member 12 provides additional security on the side of the movable harness 9. The member 7 with its integral headrest, the two harnesses 8 9 with the ventral bar 10 and the seat 6 ensure that no passenger will fall out of the roller coaster regardless of how the passenger is oriented in space.

The top horizontal bars of the two harnesses 8 and 9 provide top retention of the passenger, and good lateral retention of the head. The forward vertical bars, in cooperation with the ventral bar 10 and the seat 6, provide front retention of the passenger. The lower horizontal bars of the two harnesses 8 and 9, in cooperation with the later retention member 12 and the seat 6, provide perfect lateral retention of the passenger.

Because the movable harness 9 has its horizontal axis of rotation disposed behind the passenger's head, the ventral bar 10 can be opened upward above the passenger's head in order to permit general access to the passenger position.

Also, once the passenger is in position on the seat 6, this construction enables the passenger to bring the ventral bar 10 in contact with their abdomen, regardless of their abdominal dimension, and to lock the bar in this rotational position, thereby preventing any exit in the forward direction.

Preferably, the fixed harness is disposed on the exterior side of the train, whereby it offers high passive security in that it lacks any manipulable parts but is rigidly fixed and has a hand grip.

To sum up, the inventive device for retaining passengers meets all the stated objects, in that it enables the passenger to enjoy the feeling of danger when the roller coaster is running, but it ensures the necessary safety and comfort, and in addition facilitates easy and rapid entry and exit by the passenger.

Various changes, modifications and alterations in the teachings of the present invention may be contemplated by those skilled in the art without departing from the intended spirit and scope of the present invention. Accordingly, it is intended that the present invention only be limited by the terms of the appended claims.

What is claimed:

1. A device for retaining passengers on a roller coaster train having a chassis, which enables a passenger to ride in a standing position regardless of their orientation in space and the acceleration to which the passenger is subjected, characterized in that it is comprised of a sliding carriage which is vertically displaceable and lockable on columns, each having a base, which columns are affixed at their base to the chassis of the train, said carriage supporting at least one seat and further comprising a back member on said carriage, a fixed harness disposed on one lateral side of the back member, and a movable harness which has a ventral bar and is disposed on the other lateral side of the back member.

2. A device according to claim 1, characterized in that the seat has a saddle shape so as to be easily inserted between the legs of the passenger and so as to impede forward exit of said passenger.

3. A device according to claim 1, characterized in that the two harnesses have top and frontal bars, that in addition the fixed harness has a lower lateral bar, and the movable harness has the ventral bar on a lower region thereof.

4. A device according to claim 1, characterized in that the movable harness is connected to a lockable rotation arm disposed behind an upper part of the back member, whereby the movable harness can be swung upward in order to allow free entry into the device, and whereby said harness can then be lowered until the ventral bar is in tight contact with a passenger's abdomen.

* * * * *